United States Patent [19]

Patel

[11] Patent Number: 5,397,839
[45] Date of Patent: Mar. 14, 1995

[54] POLYESTER-HYDROGENATED DIENE RUBBER COMPOSITIONS

[75] Inventor: Raman Patel, Akron, Ohio

[73] Assignee: Advanced Elastomer Systems, L.P., St. Louis, Mo.

[21] Appl. No.: 168,107

[22] Filed: Dec. 13, 1993

[51] Int. Cl.$^6$ ............................................. C08L 67/00
[52] U.S. Cl. .................................... 525/175; 524/513
[58] Field of Search ....................... 525/175; 524/513

[56] References Cited

U.S. PATENT DOCUMENTS

| | | | |
|---|---|---|---|
| 3,037,954 | 6/1962 | Gessler et al. | 260/29.8 |
| 4,141,863 | 2/1979 | Coran et al. | 260/3 |
| 4,287,324 | 9/1981 | Coran et al. | 525/408 |
| 4,290,927 | 9/1981 | Tanaka et al. | 260/3 |
| 4,452,950 | 6/1984 | Wideman | 525/339 |
| 4,464,515 | 8/1984 | Rempel et al. | 525/338 |
| 4,631,315 | 12/1986 | Buding et al. | 525/338 |
| 5,093,426 | 3/1992 | Sakabe et al. | 525/223 |
| 5,100,947 | 3/1992 | Puydak et al. | 524/423 |
| 5,157,081 | 10/1992 | Puydak et al. | 525/237 |
| 5,216,074 | 6/1993 | Imai et al. | 525/66 |

FOREIGN PATENT DOCUMENTS 0337976 10/1989 European Pat. Off.
0440180 8/1991 European Pat. Off.

Primary Examiner—Ana L. Carrillo
Attorney, Agent, or Firm—W. A. Skinner

[57] ABSTRACT

Elastomeric compositions having improved heat aging properties are provided by blends of thermoplastic polyester resin and hydrogenated nitrile rubber. The rubber component of the composition is at least partially cured.

11 Claims, No Drawings

POLYESTER-HYDROGENATED DIENE RUBBER COMPOSITIONS

BACKGROUND

1. Field of the Invention

This invention relates to dynamically vulcanized blends having improved heat aging characteristics. Such blends can be used as toughened plastics or thermoplastic elastomers. A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

2. Description of the Related Art

Polymer blends which have a combination of both thermoplastic and elastic properties are generally obtained by combining a thermoplastic resin with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a micro-gel dispersion of cured elastomer in an uncured matrix of thermoplastic polymer In U.S. Pat. No. 4,141,863 a thermoplastic elastomer comprising a blend of rubber and a thermoplastic, high molecular weight polyester is described. The rubber component is a crosslinked homopolymer or copolymer of 1,3 butadiene. The use of the crosslinked rubber is said to improve the strength and toughness of the compositions.

Published European Patent Application No. 337,976 discloses thermoplastic elastomer compositions prepared from a blend of polyester resin and a covalently-crosslinked acrylate rubber. These thermoplastic elastomers are prepared by dynamic vulcanization and exhibit high temperature dimensional stability and low oil swell.

U.S. Pat. No. 5,093,426 teaches a combination of a thermoplastic resin such as a polyester with a specific copolymer rubber derived from alkyl acrylate, conjugated diene and another ethylenically unsaturated compound. The copolymer rubber is hydrogenated, then blended with the thermoplastic resin to provide a composition having superior low temperature performance, heat, ozone and oil resistance, mechanical strength and improved compression set.

In U.S. Pat. No. 5,216,074 a thermoplastic elastomer composition comprising a blend of thermoplastic resin with a hydrogenated diene polymer is described. The diene polymer is a high molecular weight block copolymer of segments of polybutadiene having low 1,2-vinyl content and segments of polybutadiene copolymer having high 1,2-vinyl content. This blend is said to have properties comparable to vulcanized rubber.

SUMMARY

The present invention is based on the discovery that an elastomeric composition having improved heat aging properties is provided by blends of thermoplastic polyester resin and hydrogenated nitrile rubber. The rubber component of the composition is at least partially crosslinked, and is usually present as very small, i.e. microsize, particles in the polyester matrix. Unexpectedly, these blends provide a thermoplastic elastomer which have significantly improved heat aging properties, while maintaining the desirable properties of low compression set, high tear strength and good dynamic properties over a broad temperature range. The compositions have utility in applications requiting stability under temperature extremes, and low swelling in hydrocarbon fluids. Typical uses include molded articles for automobile underhood parts, engineering and construction materials such as oil well cables, industrial parts such as hose, tubing and gaskets, and household goods.

DESCRIPTION OF THE PREFERRED EMBODIMENTS

HYDROGENATED NITRILE RUBBER

Nitrile rubber (NBR) is a known material which is typically prepared by the free radical emulsion polymerization of a $C_{3-5}$ $\alpha,\beta$-unsaturated nitrile and a $C_{4-6}$ conjugated diene. Nitrile rubber has carbon-carbon double bond unsaturation resulting from the incorporation of the conjugated diene units. Acrylonitrile-butadiene rubber is a commercially available example of a nitrile rubber.

The term "hydrogenated nitrile rubber" refers to the product obtained by catalytically hydrogenating the carbon-carbon unsaturation of nitrile rubber. Detailed descriptions of methods for the hydrogenation of nitric rubber are found in U.S. Pat. Nos. 4,452,940, 4,464,515 and 4,631,315. The NBR is typically dissolved in an appropriate solvent and, in the presence of a noble metal catalyst at elevated temperature and pressure, undergoes selective hydrogenation to produce the highly saturated polymer. The remaining level of double bond unsaturation is usually less than 10 mole percent, and preferably is less than 5 mole percent. The preferred NBR for hydrogenation is acrylonitrile-butadiene rubber, which most preferably contains 20 to 50 weight percent of acrylonitrile units prior to hydrogenation. Functionalized derivatives of NBR are also suitable for hydrogenation.

The amount of hydrogenated nitrile rubber found to be most suitable in the compositions of the invention generally ranges from about 15 to about 85 weight percent, based on the total weight of rubber and polyester. Preferably the rubber content will range from about 30 to about 80 percent by weight.

POLYESTER RESIN

Polyesters are condensation polymers characterized by the presence of carboxylate ester groups distributed either regularly or randomly along the repeating units of their main chains. Linear homo- and copolyesters are derived from self-polycondensation of hydroxycarboxylic acids, the polycondensation of dicarboxylic acids with dihydroxy compounds or by ring-opening polymerization of cyclic esters. Included are homopolymers, copolymers and mixed polyesters, as well as block or graft copolymers. The linear polyesters may be classified as aliphatic, partly aromatic or aromatic (polyarylate) polyesters, and have a wide range of properties. Of particular interest with respect to the present invention are the high molecular weight, crystalline, thermoplastic polyesters which have high heat-distortion temperatures, good mechanical strength and toughness, and are easily fabricated. The partly aromatic polyesters are especially well suited for use in the compositions of the invention. Commercially available examples of such materials are the polyalkylene terephthalates obtained from aliphatic glycols and aromatic dicarboxylic acids or esters, particularly polyethylene terephthalate (PET) and polybutylene terephthalate (PBT), also known as polytetramethylene terephthalate.

Linear thermoplastic polyester resins having a softening point above 50° C. are satisfactory; polyesters having a softening or melting point above 100° C. are preferred; and polyesters having a softening or melting point between 160° and 280° C. are most preferred. The polyester preferably has a weight average molecular weight ($M_w$) between about 15,000 and about 130,000 with a $M_w$ from about 20,000 to about 80,000 being most preferred.

The amount of thermoplastic polyester resin found to be most suitable in the compositions of the invention generally ranges from about 85 to about 15 weight percent, based on the total weight of rubber and polyester. Preferably the polyester content will range from about 70 to about 20 percent by weight.

RUBBER CURATIVES

In the compositions of the invention, the hydrogenated nitrile rubber component will generally be at least partially vulcanized, or crosslinked. Hydrogenated nitrile rubber may be vulcanized using any of the well known diene rubber curative systems, e.g. peroxides, accelerated sulfurs, phenolic resins, quinone compounds, high energy radiation and the like, both with and without accelerators and co-agents. Those ordinarily skilled in the art will appreciate the appropriate quantities, types of cure systems and vulcanization conditions required to carry out the vulcanization of the rubber. The rubber can be vulcanized using varying amounts and mixtures of curative, varying temperatures and varying time of cure in order to obtain the optimum crosslinking desired. Any known cure system for the rubber can be used, so long as it is suitable under the vulcanization conditions with the specific hydrogenated nitrile rubber, functionalized rubber or combination of rubbers being used and with the polyester. Such cure systems are well known in the art and literature of vulcanization of elastomers.

ADDITIVES

In addition to the polyester, rubber and curative components, the compositions of the invention may also include reinforcing and non-reinforcing fillers, antioxidants, stabilizers, rubber processing oil, extender oils, lubricants, plasticizers, antiblocking agents, antistatic agents, waxes, foaming agents, pigments, flame retardants and other processing aids known in the rubber compounding art. Such additives can comprise up to about 60 weight percent of the total composition, and can be in the plastic phase, the rubber phase or both. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The type will be that ordinarily used in conjunction with the specific rubber or rubbers present in the composition, and the quantity based on the total rubber content may range from zero to a few hundred phr.

PROCESSING

The hydrogenated nitrile rubber component of the thermoplastic elastomer is generally present as small, i.e. micro-size, particles within a continuous polyester resin matrix, although a co-continuous morphology or a phase inversion is also possible depending on the amount of rubber relative to polyester, and the cure system or degree of cure of the rubber. The rubber is desirably at least partially crosslinked, preferably at least 25% as measured by extractable rubber, and most preferably is completely or fully crosslinked. The partial or complete crosslinking can be achieved by adding an appropriate rubber curative to the blend of polyester and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of shear at a temperature above the melting point of the polyester component. The rubber is thus simultaneously crosslinked and dispersed as fine particles within the polyester matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "completely vulcanized" as used in the specification and claims means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081, both of which are fully incorporated herein by this reference.

The following general procedure was used in the preparation of thermoplastic elastomers of the invention as set forth in the examples. Polyester resin and hydrogenated nitrile rubber were mixed in a Brabender mixer at a temperature sufficient to melt the polyester and form a blend. Curatives are added to crosslink the rubber and mixing is continued until a maximum melt consistency is reached, usually between one and five minutes, then for an additional two to three minutes thereafter. The sequence of ingredient addition may vary, but generally all of the fillers should be added before substantial crosslinking, or vulcanization, occurs. The stabilizers and plasticizers may be added either before or after vulcanization. The vulcanized composition is removed from the mixer, sheeted, then returned to the mixer and blended again for one to two minutes at the same temperature. The material is removed from the mixer, sheeted and compression molded at 30° to 50° C. above the melting point of the polyester component, and cooled below 100° C. under pressure. Properties of the molded sheet are then measured.

The following examples serve to illustrate but not limit the present invention.

EXAMPLE 1

Compositions of the invention were prepared by the procedure described above. The physical properties of these compositions were compared with those of materials prepared from non-hydrogenated diene rubber. The properties were measured before and after heat aging— see Table I. The concentration of the components is expressed as parts by weight, and the designation "NM" indicates that the noted property was not measured.

It is apparent from the data in Table I that the compositions of the invention prepared using hydrogenated nitrile rubber have both substantially improved low temperature brittle points and superior heat aging properties, when compared to compositions prepared using nitrile rubber. The tensile strength and ultimate elongation of the compositions of the invention are both retained, even after 168 hours at 150° C. In comparison, the compositions prepared using nitrile rubber display a dramatic reduction in tensile strength and ultimate elongation after only 72 hours at 150° C.

EXAMPLE 2

A series of compositions was prepared using the general procedure set forth above. The proportions of polyester and hydrogenated nitrile rubber in the blends were varied over the range of 10 to 90 parts by weight. Physical properties were measured after 24 hours of conditioning at ambient temperature. The properties are set forth in Table II.

TABLE I

| | Blend Number- | | | | | | | |
|---|---|---|---|---|---|---|---|---|
| | 1 | 2 | 3 | 4 | 5 | 6 | 7 | 8 |
| PBT[1] | 40 | 40 | 40 | 40 | 40 | 40 | 40 | 40 |
| HNBR[2] | 60 | 60 | 60 | 60 | 60 | — | — | — |
| NBR[3] | — | — | — | — | — | 60 | 60 | 60 |
| Stabilizer[4] | 1.8 | 1.8 | 1.8 | 1.8 | 1.8 | 1.8 | 1.8 | 1.8 |
| Curatives: | | | | | | | | |
| HVA-2[5] | 1.5 | 1.5 | 3.0 | 3.0 | — | 1.5 | — | — |
| SP1045[6] | — | — | — | — | 4.5 | — | 4.5 | 4.5 |
| MBTS[7] | 0.3 | 0.6 | 0.3 | 0.6 | — | 0.3 | — | — |
| SnCl$_2$ | — | — | — | — | 0.15 | — | 0.3 | 0.6 |
| Properties: | | | | | | | | |
| Hardness (Shore) | 38D | 39D | 38D | 39D | 86A | 39D | 37D | 39D |
| Tensile strength[8] (psi) | 2840 | 2860 | 3000 | 3000 | 2080 | 2720 | 2120 | 2350 |
| 72 hr/150° C. | NM | NM | NM | NM | NM | 1900 | 1800 | 2050 |
| 168 hr/150° C. | 3300 | 3250 | 3700 | 3500 | 2960 | NM | NM | NM |
| Modulus 100%[8] (psi) | 1550 | 1550 | 1800 | 1800 | 1400 | 2060 | 1550 | 1460 |
| Ultimate Elongation[8] (%) | 420 | 370 | 400 | 320 | 350 | 170 | 240 | 250 |
| 72 hr/150° C. | NM | NM | NM | NM | NM | 80 | 50 | 50 |
| 168 hr/150° C. | 370 | 320 | 380 | 390 | 320 | NM | NM | NM |
| % Oil Swell/125° C.[9] | 13.6 | 13.2 | 13.4 | 13.0 | 14.2 | 7.9 | 10.0 | 9.1 |
| % Oil Swell/150° C. | 15.1 | 15.0 | 14.9 | 15.1 | 16.2 | 8.8 | 10.9 | 10.6 |
| Low Temp Brittle Pt. (°C.) | ~−60 | ~−60 | ~−60 | ~−60 | ~−60 | −50 | −30 | −28 |

[1] polybutylene terephthalate (Tenite 6P20A from Eastman)
[2] hydrogenated nitrile rubber (Zetpol 2020 from Nippon Zeon)
[3] nitrile rubber (Krynac 38.50 from Polysar)
[4] 0.6 phr Santoflex 13; 0.3 phr NBC; 0.9 phr Agerite Stalite
[5] m-phenylene bis-maleimide
[6] dimethylol-p-octyl phenol (nonhalogenated)
[7] 2-bis-benzothiazyl disulfide
[8] ASTM D412
[9] ASTM D471

TABLE II

| | Blend Number- | | | | | | | | |
|---|---|---|---|---|---|---|---|---|---|
| | 9 | 10 | 11 | 12 | 13 | 14 | 15 | 16 | 17 |
| PBT[1] | 10 | 20 | 30 | 40 | 50 | 60 | 70 | 80 | 90 |
| HNBR[2] | 90 | 80 | 70 | 60 | 50 | 40 | 30 | 20 | 10 |
| Stabilizer[3] | 2.7 | 2.4 | 2.1 | 1.8 | 1.5 | 1.5 | 1.5 | 1.5 | 1.5 |
| Curatives: | | | | | | | | | |
| HVA-2[4] | 2.7 | 2.4 | 3.5 | 3.0 | 2.5 | 2.0 | 1.5 | 1.0 | 0.5 |
| MBTS[5] | 0.9 | 0.6 | 0.875 | 0.75 | 0.625 | 0.5 | 0.375 | 0.25 | 0.125 |
| Lubricant[6] | 0.9 | 0.8 | 0.7 | 0.6 | 0.5 | 0.5 | 0.5 | 0.5 | 0.5 |
| Properties: | | | | | | | | | |
| Hardness (Shore) | 55A | 69A | 82A | 35D | 48D | 52D | 62D | 64D | 68D |
| Tensile strength[7] (psi) | 1250 | 1520 | 2460 | 2640 | 3080 | 2800 | 3270 | 3680 | 5670 |
| Modulus 100%[7] (psi) | 340 | 790 | 1220 | 1460 | 2010 | 2500 | 3270 | 3860 | NM |
| Ultimate Elongation[7] (%) | 400 | 250 | 310 | 345 | 350 | 260 | 200 | 160 | 35 |
| % Oil Swell/150° C.[8] | 20 | 18 | 15 | 13 | 1.1 | 8.5 | 6.1 | 4.5 | 2.9 |

TABLE II-continued

| | Blend Number- | | | | | | | | |
|---|---|---|---|---|---|---|---|---|---|
| | 9 | 10 | 11 | 12 | 13 | 14 | 15 | 16 | 17 |
| Low Temp Brittle Pt. (°C.) | <−60 | <−60 | <−60 | <−60 | <−60 | <−60 | <−60 | <−60 | −50 |

[1] polybutylene terephthdate (Tenite 6P20A)
[2] hydrogenated nitrile rubber (Tornac 38.45 from Polysar Ltd.)
[3] 1.0 phr Santoflex 13; 0.5 phr NBC; 1.5 phr Agerite Stalite
[4] m-phenylene bis-maleimide
[5] 2-bis-benzothiazyl disulfide
[6] alcohol phosphate, unneutralized (Zelec UN from E.I. duPont)
[7] ASTM D412
[8] ASTM D471

As seen from the data in Table II the compositions of the invention may be prepared using a broad range of proportions of polyester and hydrogenated nitrile rubber, while maintaining the improved low temperature brittle point and the desirable properties of elongation and tensile strength.

EXAMPLE 3

Compositions were prepared with several polyester and copolyester materials, using the general procedure set forth above with the exception that the stabilizer components were added to the blend at the completion of the dynamic vulcanization step. Physical properties were measured before and after heat aging, and are set forth in Table III.

TABLE III

| | Blend Number- | | | |
|---|---|---|---|---|
| | 18 | 19 | 20 | 21 |
| Polyester | | | | |
| PETG[1] | 40 | — | — | — |
| Vitel 4302[2] | — | 40 | — | — |
| Hytrel 7246[3] | — | — | 40 | — |
| Hytrel 5555HS[4] | — | — | — | 40 |
| HNBR[5] | 60 | 60 | 60 | 60 |
| Stabilizer[6] | 1.86 | 1.86 | 1.86 | 1.86 |
| Lubricant[7] | 0.6 | 0.6 | 0.6 | 0.6 |
| Curatives: | | | | |
| SP1045[8] | 3.0 | 3.0 | 3.0 | 3.0 |
| SnCl$_2$ | 0.18 | 0.18 | 0.18 | 0.18 |
| Properties: | | | | |
| Hardness (Shore) | 33D | 34D | 32D | 85A |
| 168 hr/150° C. | 36D | 43D | 38D | 86A |
| Tensile strength[9] (psi) | 3280 | 530 | 3600 | 2550 |
| 168 hr/150° C. | 3460 | 2220 | 3660 | 2390 |
| Modulus 100%[9] (psi) | 1380 | 510 | 1020 | 820 |

TABLE III-continued

| | Blend Number- | | | |
|---|---|---|---|---|
| | 18 | 19 | 20 | 21 |
| 168 hr/150° C. | 1900 | 1660 | 1510 | 900 |
| Ultimate Elongation[9] (%) | 360 | 110 | 490 | 480 |
| 168 hr/150° C. | 220 | 160 | 300 | 320 |
| % Oil Swell/125° C.[10] | 16 | 13 | 15 | 18 |
| Low Temp Brittle Pt. (°C.) | <−60 | <−50 | <−60 | <−60 |

[1] copolyester 6763 from Eastman
[2] mixed polyester from Goodyear
[3] polyester block copolymer from duPont
[4] polyester block copolymer from duPont
[5] hydrogenated nitrile rubber (Zetpol 2020)
[6] 1.5 phr Irganox 565; 1.5 phr distearyl thiodipropionate; 0.06 phr MgO
[7] alcohol phosphate, unneutralized
[8] dimethylol-p-octyl phenol (nonhalogenated)
[9] ASTM D412
[10] ASTM D471

EXAMPLE 4

Compositions of the invention were prepared with varying degrees of vulcanization, using the general procedure set forth above and adjusting the amount of curative as necessary. Physical properties were measured after 24 hours at ambient temperature, and the results are set forth in Table IV. The percent of extractable rubber in the finished compositions, which is one measure of the degree of cure (vulcanization), was also measured by determining the amount of soluble rubber, and is set forth in Table IV. This measurement was made by soaking a thin film of the cured composition in dichloromethane for 48 hours at room temperature, and determining the amount of rubber extracted.

TABLE IV

| | Blend Number- | | | | | | | | |
|---|---|---|---|---|---|---|---|---|---|
| | 22 | 23 | 24 | 25 | 26 | 27 | 28 | 29 | 30 |
| PBT[1] | 40 | 40 | 40 | 40 | 40 | 40 | 40 | 40 | 40 |
| HNBR[2] | 60 | 60 | 60 | 60 | 60 | 60 | 60 | 60 | 60 |
| Stabilizer[3] | 1.8 | 1.8 | 1.8 | 1.8 | 1.8 | 1.8 | 1.8 | 1.8 | 1.8 |
| Lubricant[4] | 0.6 | 0.6 | 0.6 | 0.6 | 0.6 | 0.6 | 0.6 | 0.6 | 0.6 |
| Curatives: | | | | | | | | | |
| HVA-2 | 0 | 1.2 | 1.8 | 2.4 | 4.8 | 0 | 0 | 0 | 0 |
| MBTS | 0 | 0.3 | 0.45 | 0.6 | 1.2 | 0 | 0 | 0 | 0 |
| SP1045 | 0 | 0 | 0 | 0 | 0 | 0.6 | 2.4 | 4.8 | 4.8 |
| SnCl$_2$ | 0 | 0 | 0 | 0 | 0 | 0.12 | 0.12 | 0.12 | 0 |
| Properties: | | | | | | | | | |
| Hardness (Shore) | 68A | 86A | 91A | 92A | 37D | 87A | 92A | 37D | 92A |
| Tensile strength[5] (psi) | 640 | 1390 | 2150 | 2890 | 3210 | 1490 | 2300 | 3140 | 2470 |
| Modulus 100%[5] (psi) | 310 | 1120 | 1480 | 1490 | 1640 | 1100 | 1100 | 1400 | 1100 |
| Ultimate Elongation[5] (%) | 950 | 230 | 360 | 470 | 430 | 300 | 450 | 420 | 470 |
| % Oil Swell 150° C.[6] | 11.5 | 11.0 | 10.0 | 9.7 | 9.1 | 10.9 | 11.6 | 10.8 | 9.9 |
| Low Temp Brittle Pt. (°C.) | >−30 | −52 | −52 | −58 | −58 | −32 | −48 | −52 | −58 |
| % Extractable Rubber | 96.6 | 55.7 | 47.2 | 12.0 | 11.0 | 51.0 | 29.5 | 13.3 | 26.3 |

[1] polybutylene terephthalate (Valox 325 from General Electric)
[2] hydrogenated nitrile rubber (Zetpol 1020 from Nippon Zeon)
[3] 0.9 phr Agerite Stalite; 0.3 phr NBC; 0.6 phr Santoflex 13 - Blends 27-29 contained an additional 0.06 phr MgO
[4] alcohol phosphate, unneutralized
[5] ASTM D412
[6] ASTM D471

While the best mode and preferred embodiment of the invention have been set forth in accord with the Patent Statutes, the scope of the invention is not limited thereto, but rather is defined by the attached claims.

What is claimed is:

1. A composition comprising
   (a) thermoplastic polyester resin and
   (b) hydrogenated nitrile rubber, wherein said rubber is at least partially crosslinked.

2. The composition of claim 1 wherein the polyester resin is a polyalkylene terephthalate.

3. The composition of claim 2 wherein the polyester resin is selected from the group consisting of polyethylene terephthalate, polybutylene terephthalate, and mixtures thereof.

4. The composition of claim 1 wherein the polyester resin has a molecular weight from about 20,000 to about 80,000.

5. The composition of claim 1 wherein the polyester resin is present in the range of about 15 to about 85 parts by weight and the rubber is present in the range of about 85 to about 15 parts by weight based on the total weight of the polyester and rubber.

6. The composition of claim 1 wherein the polyester resin is present in the range of about 70 to about 20 parts by weight and the rubber is present in the range of about 30 to about 80 parts by weight based on the total weight of the polyester and rubber.

7. The composition of claim 1 which additionally includes curatives for the rubber, processing oil for the rubber, plasticizers, fillers, antioxidants or other additives.

8. The composition of claim 1 wherein no more than about 75% of the rubber is extractable in dichloromethane.

9. The composition of claim 1 wherein the rubber is fully crosslinked.

10. The composition of claim 1 wherein the rubber is crosslinked by dynamic vulcanization.

11. A composition comprising
    (a) from about 70 to about 20 parts by weight of a thermoplastic polyester resin selected from the group consisting of polyethylene terephthalate, polybutylene terephthalate, and mixtures thereof and
    (b) from about 30 to about 80 parts by weight of a hydrogenated nitrile rubber having less than about 5 mole percent double bond unsaturation, wherein the amounts of (a) and (b) are based on the total weight of the polyester and rubber, and wherein said rubber is has been fully crosslinked by dynamic vulcanization.

* * * * *